US012619214B2

(12) United States Patent (10) Patent No.: US 12,619,214 B2
Burleson et al. (45) Date of Patent: May 5, 2026

(54) INTERFACE AND CONTROL OF UNDERWATER ROBOTICS, INSTRUMENTS, AND SENSORS FROM A HUMAN OCCUPIED SUBMERGED SPACE

(71) Applicants: Arizona Board of Regents on Behalf of the University of Arizona, Tucson, AZ (US); Lombardi Undersea LLC, Middletown, RI (US)

(72) Inventors: Winslow Burleson, Tucson, AZ (US); Michael Lombardi, Middletown, RI (US)

(73) Assignees: Arizona Board of Regents on Behalf of the University of Arizona, Tucson, AZ (US); Lombardi Undersea LLC, Middletown, RI (US)

( * ) Notice: Subject to any disclaimer, the term of this patent is extended or adjusted under 35 U.S.C. 154(b) by 68 days.

(21) Appl. No.: 18/649,576

(22) Filed: Apr. 29, 2024

(65) Prior Publication Data

US 2024/0361752 A1 Oct. 31, 2024

Related U.S. Application Data

(60) Provisional application No. 63/498,564, filed on Apr. 27, 2023.

(51) Int. Cl.
G05B 19/4155 (2006.01)

(52) U.S. Cl.
CPC .................... G05B 19/4155 (2013.01); G05B 2219/40271 (2013.01)

(58) Field of Classification Search
CPC .................. G05B 19/4155; G05B 2219/40271
(Continued)

(56) References Cited

U.S. PATENT DOCUMENTS 9,913,409 B2 * 3/2018 Cutler ..................... F28D 15/00
10,011,247 B2 * 7/2018 Joao ................... B64D 45/0031
(Continued)

OTHER PUBLICATIONS

Delphin Raj K.M. et al; Underwater Network Management System in Internet of Underwater Things; 2020, Electronics 2020, 9, 1142; doi:10.3390/electronics9071142 (Year: 2020).*

*Primary Examiner* — Jaime Figueroa
(74) *Attorney, Agent, or Firm* — BLANK ROME LLP

(57) ABSTRACT

A networked system architecture including hardware and software elements permits data transmission between underwater systems. The network architecture includes data transmission between underwater computers, instruments, robotic vehicles, human-occupied underwater habitats, and/or worn sensor devices. Data is transmitted over wired communication channels, wireless communication channels, or a combination thereof. The network is established independent of surface connectivity (e.g., a topside connection) and creates a Local Area Network (LAN) or Wide Area Network (WAN) specific to an underwater environment. A system administrator, such as a diver, operates an underwater and waterproof computer to control and operate an underwater and waterproof device (e.g., a robotic vehicle) over the LAN/WAN. The underwater device may be a remotely operated vehicle (ROV), an autonomous underwater vehicle (AUV), a drifting sensor, a moored sensor, or the like.

20 Claims, 3 Drawing Sheets

(58) Field of Classification Search
USPC ................. 700/245–264; 318/568.11–568.25
See application file for complete search history.

(56) References Cited

U.S. PATENT DOCUMENTS

| | | | | |
|---|---|---|---|---|
| 10,155,573 | B2 | 12/2018 | Burleson et al. | |
| 10,524,395 | B2 * | 12/2019 | Cutler | H05K 7/20745 |
| 11,711,135 | B1 * | 7/2023 | Gajjar | H04B 7/155 |
| | | | | 370/316 |
| 11,856,686 | B1 * | 12/2023 | Magcale | H05K 7/20272 |
| 12,024,270 | B2 * | 7/2024 | Lebo | B33Y 80/00 |
| 2008/0127878 | A1 * | 6/2008 | Marion | B63B 43/12 |
| | | | | 114/337 |
| 2010/0040375 | A1 * | 2/2010 | Sexton | H04B 11/00 |
| | | | | 398/104 |
| 2014/0341584 | A1 * | 11/2014 | Hopewell | H04B 10/564 |
| | | | | 398/104 |
| 2015/0136012 | A1 * | 5/2015 | Williams | B25J 9/08 |
| | | | | 901/1 |
| 2015/0138920 | A1 * | 5/2015 | Hiller | H04B 11/00 |
| | | | | 367/87 |
| 2016/0378981 | A1 * | 12/2016 | Cutler | A01K 67/30 |
| | | | | 726/23 |
| 2016/0381835 | A1 * | 12/2016 | Cutler | H05K 7/20836 |
| | | | | 361/679.46 |
| 2017/0331899 | A1 * | 11/2017 | Binder | H04L 67/12 |
| 2020/0252138 | A1 * | 8/2020 | Lambert | H04B 11/00 |
| 2021/0371067 | A1 * | 12/2021 | Lebo | B33Y 80/00 |
| 2023/0308341 | A1 * | 9/2023 | Park | H04L 41/048 |

* cited by examiner

INTERFACE AND CONTROL OF UNDERWATER ROBOTICS, INSTRUMENTS, AND SENSORS FROM A HUMAN OCCUPIED SUBMERGED SPACE

CROSS-REFERENCE TO RELATED APPLICATIONS

This application claims the benefit of U.S. Provisional 63/498,564, filed Apr. 27, 2023, which is hereby incorporated by reference as submitted in its entirety.

FIELD OF THE INVENTION

The present disclosure relates to an underwater networked system architecture and, more particularly, to the control of underwater instruments in a subsea networked environment.

BACKGROUND

Subsea robotics are most frequently deployed from the surface and communicated via hardwired tethers or wirelessly through acoustic signal transmission. Those robotic systems include, for example, remotely operated vehicles (ROVs), autonomous underwater vehicles (AUVs), as well as independent drifting or moored sensors. By contrast, human divers have endeavored to operate underwater autonomously via self-contained underwater breathing apparatus (SCUBA), surface supplied diving techniques, or while within the protected space of one atmosphere suits or submersibles. Underwater robotics and divers have operated in parallel, though it is not common practice to interface for the purpose of enhancing capabilities and addressing limitations of each independent system or technique. Robots do not have dexterous manipulation, while the human hand is needed for delicate work. Humans do not have unlimited life support capacity, while robots can operate without physiological limitations.

SUMMARY

A system is described as one that can be used and operated by divers while underwater or within submerged spaces. The system described may be used and operated within habitats or submersibles which allows control of subsea robotics without a topside connection. In some embodiments, the described system may include a combination of hardware and software interfaces to enable operation of subsea robotics by a diver while underwater. Additionally, the hardware/software enable operation of subsea instruments without a surface connection. Operation without a surface connection reduces operational complexity. Additionally, or alternatively, operation sans topside connection enhances synergistic capabilities.

In another embodiment, a networked system architecture including hardware and software elements which permits data transmission between underwater systems is provided. The network architecture includes data transmission between underwater computers, instruments, robotic vehicles, human-occupied underwater habitats, and/or worn sensor devices. Data is transmitted over wired communication channels, wireless communication channels, or a combination thereof. The network is established independent of surface (e.g., topside) connectivity and creates a Local Area Network (LAN) or Wide Area Network (WAN) specific to an underwater environment. A system administrator, such as a diver, operates an underwater computer to control and operate another underwater device (e.g., a robotic vehicle) over the LAN/WAN. The underwater device may be a remotely operated vehicle (ROV), an autonomous underwater vehicle (AUV), a drifting sensor, a moored sensor, or the like. Additionally, or alternatively, the system may be autonomously administered (e.g., via rules-based algorithms and/or adaptive emerging AI approaches and/or underwater collaborative robot ROV/AUV).

In a first aspect, a submerged computing environment is provided. The submerged computing environment includes a first set of one or more computing devices associated with one or more system administrators, a second set of one or more computing devices communicatively coupled to the first set of computing devices, and a submersible habitat comprising a third set of one or more computing devices communicatively coupled to the first and second set of one or more computing devices. At least one of the first set of one or more computing devices is configured to: (i) transmit information, such as one or more control commands and/or information, to the second set of one or more computing devices, (ii) receive one or more signals from the second set of one or more computing devices in response to the one or more control commands, and (iii) transmit an alert to the third set of one or more computing devices based on the one or more signals received from the second set of one or more computing devices.

In a second aspect, an underwater communication system is provided. The underwater communication system includes a submersible habitat for scientific research. The submersible habitat includes modular compartments with reinforced pressure-resistant walls or an ambient pressure system, integrated life support systems, one or more communication interfaces, a data center, a network access point, and an anchoring mechanism. Additionally, the underwater communication system includes a plurality of computing devices, each computing device equipped with a network communication interface. The plurality of computing devices forms an underwater computer network to facilitate data exchange in an underwater environment. A plurality of underwater sensors is connected to the underwater computer network, either via a wired connection or a wireless connection. At least one of the plurality of computing devices is housed within the submersible habitat and is configured to: (i) receive one or more signals from the plurality of sensors via the underwater computer network, (ii) detect for anomalies in the one or more signals, and (iii) in response to detecting at least one anomaly in the one or more signals, transmit an alert to trigger an alarm within the submersible habitat.

In a third aspect, a submersible habitat for scientific research is provided. The submersible habitat includes one or more modular compartments with reinforced pressure-resistant walls or an ambient pressure system, integrated life support systems, and one or more communication interfaces. The submersible habitat also includes at least one computing device comprising a memory and a processor. The memory includes instructions that when executed by the processor implements: (i) receiving, via a user interface, one or more control commands to operate one or more underwater devices, (ii) sending, via the one or more communication interfaces, the one or more control commands to the one or more underwater devices, (iii) receiving, from the one or more underwater devices, sensor data from one or more environmental sensors of the one or more underwater devices, (iv) in response to the sensor data comprising anomaly data, generating an alert based on the anomaly data, and (v) transmitting the alert on an underwater communication network.

BRIEF DESCRIPTION OF THE DRAWINGS

A more complete appreciation of the invention and many of the advantages thereof will be readily obtained as the same becomes better understood by reference to the following detailed description when considered in connection with the accompanying drawings.

DETAILED DESCRIPTION

Figure 1:
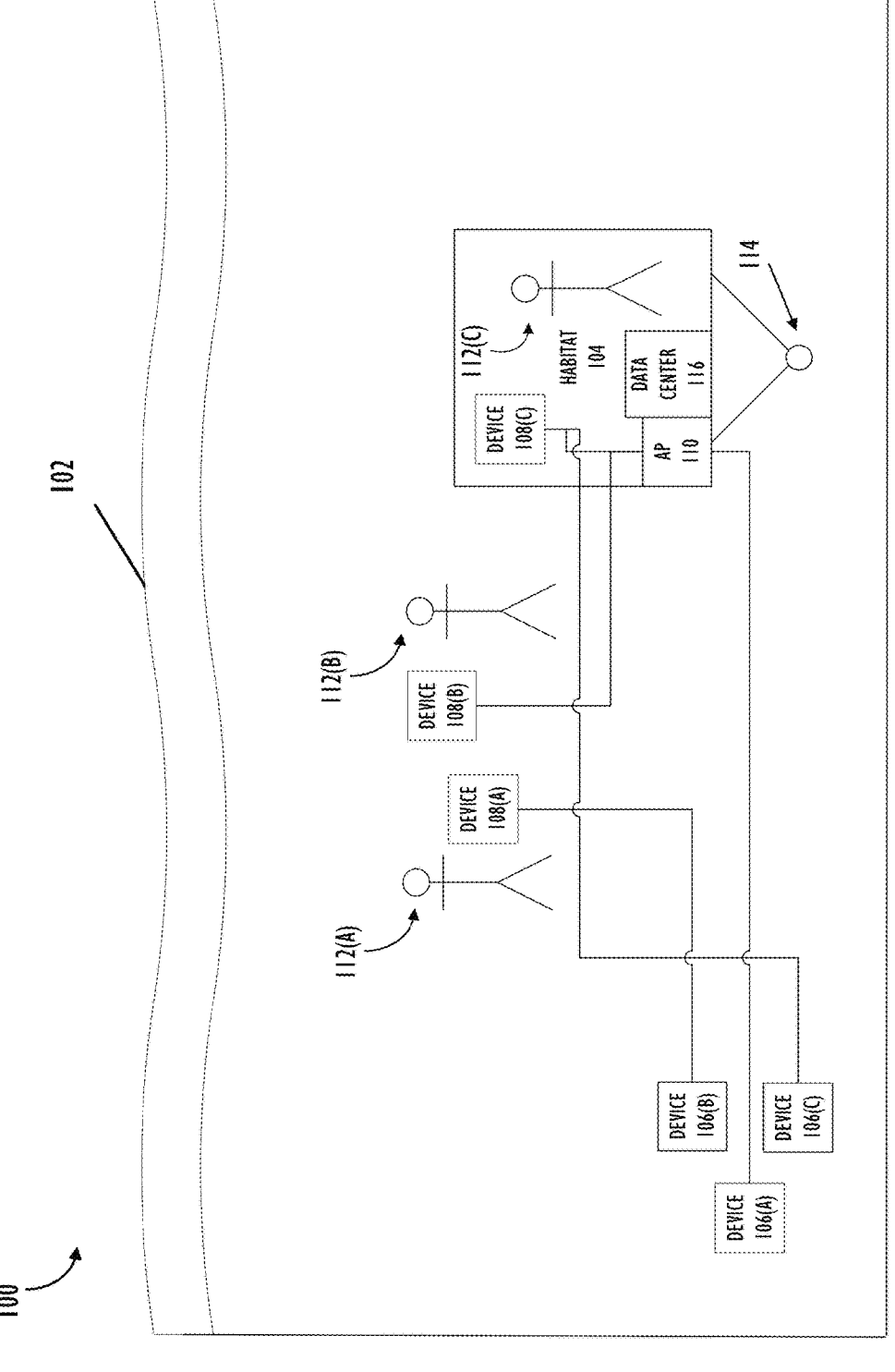
FIG. 1 shows an exemplary diagram for interfacing and controlling underwater robotics and/or instruments in a submerged environment in accordance with one or more of the disclosed embodiments.

The present disclosure is directed to, inter alia, various embodiments of techniques for interfacing and controlling underwater robotics and/or instruments in a submerged environment. In some embodiments, a user interface is provided by which a user can select a set of operational parameters for one or more underwater robotic systems. In some embodiments, the user interface may be provided to the user via an underwater computing device.

In some embodiments of the disclosed technology, an underwater operating system is provided. The underwater operating system may include multiple sets of computing devices. A first set of computing devices may be associated with one or more system administrators. A second set of computing devices may be communicatively coupled to the first set. The first set of computing devices may have the capability to transmit control commands to the second set of devices. In response to those commands, the second set of devices sends signals back to the first set. The underwater operating system may include a data center coupled to an access point. The data center and access point may be contained within an underwater habitat.

The system administrators associated with the first set of devices may be a diver, a submersible pilot or operator, a habitat occupant, or an underwater data center technician. Those administrators operate the first set of devices within a submerged space, which could be an underwater habitat. Additionally, or alternatively, the system may be autonomously administered (e.g., via rules-based algorithms and/or adaptive emerging AI approaches and/or underwater collaborative robot ROV/AUV).

In some embodiments of the disclosed technology, underwater computing devices may include hardware and waterproofing components to function effectively in aquatic environments. Waterproofing components may include, for example, the use of sealed enclosures that house underwater computing devices. The sealed enclosures may be made of materials like polycarbonate. These enclosures are thick enough to withstand the water pressure at the desired depth. For example, at a depth of 15-20 feet underwater (about 7-10 psi or 0.5-0.7 atm), a sealed polycarbonate box can provide adequate protection. If a computing device requires cables for power or data transfer, additional care may be needed. Waterproof connectors and cable glands may be used to ensure that water does not penetrate through cable entry points. Some underwater devices may be filled with a nonconducting, incompressible fluid (such as oil) inside the enclosure. This fluid may, in some examples, help maintain pressure balance and prevent water ingress.

In some embodiments of the disclosed technology, underwater computing devices may include one or more specialized components. Specialized components may include buttons, switches, and touchscreens that are designed to work underwater. The specialized components may be coated with waterproof materials or use capacitive touch technology that works even when wet. Additionally, the underwater computing devices may include acoustic transmitters and receivers. The acoustic transmitters and receivers, when coupled to the underwater computing devices, enable divers to navigate and communicate in aquatic environments.

In some embodiments, industrial-grade waterproofing of the disclosed computing devices may be provided. Industrial-grade waterproof computers, displays, and keyboards may be designed for harsh environments. These products may be resistant to liquids, dust, and dirt, making them suitable for marine, scientific research, military, and other demanding applications.

In some embodiments of the disclosed technology, an underwater operating system is provided. The underwater operating system may include a plurality of interconnected computing devices. The computing devices may include, for example, computing devices suitable for underwater use. Additionally, the computing devices may include underwater electrical components including, but not limited to, underwater cables, tethers, connectors, or the like.

The first and second sets of computing devices may be connected either wirelessly, through a wired connection, or a combination of both. The control commands transmitted by the first set of devices can manipulate the movement of at least one device in the second set. The second set of devices may include, for example, a remotely operated vehicle (ROV), an autonomous underwater vehicle (AUV), a drifting sensor, and a moored sensor. These devices respond to the control commands sent by the first set of devices, providing a versatile and robust underwater operating system.

The disclosed technology revolutionizes underwater exploration and data collection, providing a new level of control and communication between surface operators and underwater devices. It also enhances safety and efficiency for divers and other underwater personnel by providing them with a greater degree of control over their environment.

For purposes of this disclosure, the term "submerged environment" refers to an underwater physical environment where users can interface and control underwater robotic systems without the assistance of electronic devices topside (e.g., above the water's surface, land-based devices). A submerged environment can include, for example, a pool, a deep-sea exploration site, or the like. Within this disclosure, the term "underwater robotic systems" may refer to remotely operated vehicles (ROVs), autonomous underwater vehicles (AUVs), independent drifting or moored sensors, or the like.

Exemplary Architecture for Underwater Robotics and Instruments Interface and Control Referring to FIG. 1, a simplified block diagram 100 is depicted of an underwater operating environment under a water's surface 102. Block diagram 100 shows a plurality of client devices 108(A), 108(B), and 108(C) connected to a plurality of tethered/untethered devices 106(A), 106(B), and 106(C). Each of the client devices 108(A)-108(C) may be associated with one or more users, such as users 112(A)-

112(C). Individual client devices 108 may be connected to one or more of the tethered/untethered devices via a direct link (e.g., Device 108(A)'s connection to Device 106(B)) or over a network via an access point 110 (e.g., Device 108 (B)'s connection to Device 106(A)). In some embodiments, a client device may be operated within a submersible habitat, such as client device 108(C) within habitat 104. Habitat 104 may be a portable inflatable habitat that provides a breathable environment, such as the portable inflatable habitat described in U.S. Pat. No. 10,155,573 B2. Alternatively, habitat 104 may be an underwater data center, a submarine, or the like. As described herein and in at least one exemplary embodiment, a diver may provide user input to a client device (e.g., client device 108(B)) to operate and control an underwater robot (e.g., device 106(*a*)) over a network (e.g., AP 110)). Operation and control of robotic vehicles and underwater instruments may be provided independent of surface connectivity.

Habitat 104 may, in some embodiments, be a human-occupied habitat that may be used to support a diver, or a group of divers, underwater. The habitat 104 may provide a breathable environment that is maintained underwater. The habitat may have a collapsible envelope that takes shape through inflation to an expanded state underwater. Additionally, or alternatively, habitat 104 may include a modular payload which removably attaches to the envelope underwater. The modular payload may have a breathable gas source to provide breathable gas for the diver to breathe in the habitat and a carbon dioxide scrubber which removes carbon dioxide from the environment when the habitat is underwater. Additionally, habitat 104 may include an anchor mechanism 114 attached to the habitat to maintain the habitat at a desired depth underwater. Habitat 104 may include a seat, or multiple seats, on which a diver, such as user 112(C), or multiple divers, may sit while the habitat is underwater. Habitat 104 may include a data center that may be accessible to devices 106(A)-(C) and 108(A)-(C) via access point 110.

In some embodiments, devices 106(A)-(C) may include tethered instruments, untethered instruments, or combinations thereof.

Exemplary Network Architecture of an Underwater Operating Environment

Figure 2:
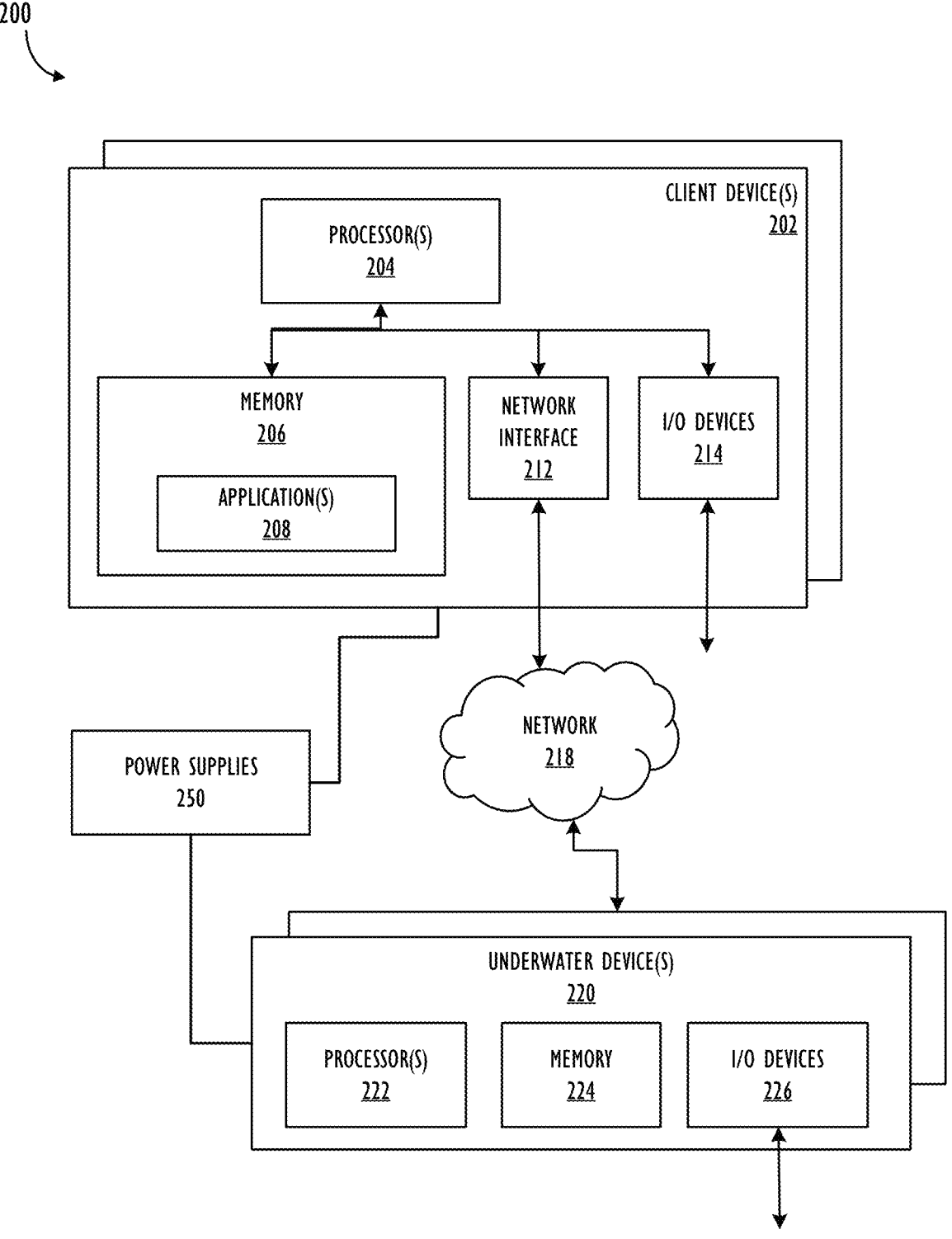
FIG. 2 shows a network diagram of an environment in which an underwater operating environment may be deployed in accordance with one or more of the disclosed embodiments.

Referring to FIG. 2, a network diagram is depicted of an underwater operating environment 200 in which multiple underwater devices may be deployed and operated, according to one or more embodiments. Similar to FIG. 1 described above, the underwater operating environment 200 includes multiple client devices, such as client device(s) 202 communicably connected to networked underwater device(s) 220 across a network 218. Although a particular representation of components and modules is presented, it should be understood that in some embodiments, the various components and modules may be differently distributed.

Client device(s) 202 may each be computing devices from which an interface to control and operate networked underwater device(s) 220 is accessed. The underwater operating environment may include a networked system architecture including a combination of hardware and software elements. The hardware and software elements permit data transmission among and between two or more underwater client devices 202 while being administered by a human operator within a submerged space and/or in the water. The network architecture may include hardwired connections (e.g., tethered devices) or wireless voice and/or data transmission from underwater devices 220. In some embodiments, a Local Area Network (LAN) or Wide Area Network (WAN)

218 may be created to facilitate data transmission. Underwater devices 220 may include devices such as underwater computers, instruments, robotic vehicles, and human occupied or worn sensor systems. The network may be established independent of surface connectivity, creating a LAN/WAN specific to the underwater operating environment. The system administrator may be a diver, submersible pilot or operator, habitat occupant, or underwater data center technician.

A client device 202 may include a processor 204 and a memory 206. Applications 208 may be stored on the memory 206 and include one or more software elements to provide an interface to a user to operate and/or control an underwater device, such as underwater device 220. In some embodiments, control commands may be issued to an underwater device based on a user input via an I/O device 214. An I/O device may include, for example, a touchscreen interface. One or more of the control commands may be transmitted via network interface 212 to an underwater device, such as underwater device 220, over a network, such as network 218. As described herein, the underwater device 220 may be tethered to a client device 202 over a wired connection. Alternatively, the underwater device 220 may be untethered but still connected to the client device over a wireless link. Underwater device(s) may include a processor 222, a memory 224, and I/O devices 226. Typical I/O devices may include sensors, instrument panels, gauges, or the like.

The underwater operating environment 200 may incorporate computer and robotic hardware that is repackaged in water and pressure tolerant enclosures or potting compounds or is by its design tolerant in water. The enclosed hardware can be transferred through the water and across depths while maintaining functionality.

Power supplies 250 (e.g., batteries, other chemistry, and/or capacitors storing power) may be provided for the client device(s) and underwater device(s) and may be local to the underwater operating environment. Example power supplies may include batteries repackaged in water and pressure tolerant enclosures or potting compounds. Power may also be obtained from the environment in a number of ways (salt, temperature, pressure and/or other gradients, solar, wave action, human power, etc.). In some embodiments, the power supplies may be recharged or sustained by extracting energy from the underwater operating environment (tidal energy, waves/currents, chemical energy, see prior examples as well). Additionally, hardware may interact via hardwired data transmission or acoustic or optical and/or quantum electro-magnetic, transmission packets.

Human-computer network manipulation may occur through a voice, visual, or touch interface compatible with the underwater environment. These may also be symbiotically managed via human physiology and/or environmental sensors and algorithms. For example, a self-modulating reef may be triggered by the influx of a nutrient gradient, and this "event" might set off a wake-up alarm in a human occupied habitat. Additionally, or alternatively, this "event" might alert other organisms in one or more ways (visual, lighting, acoustic, chemical, etc.).

Exemplary Computing Device

Figure 3:
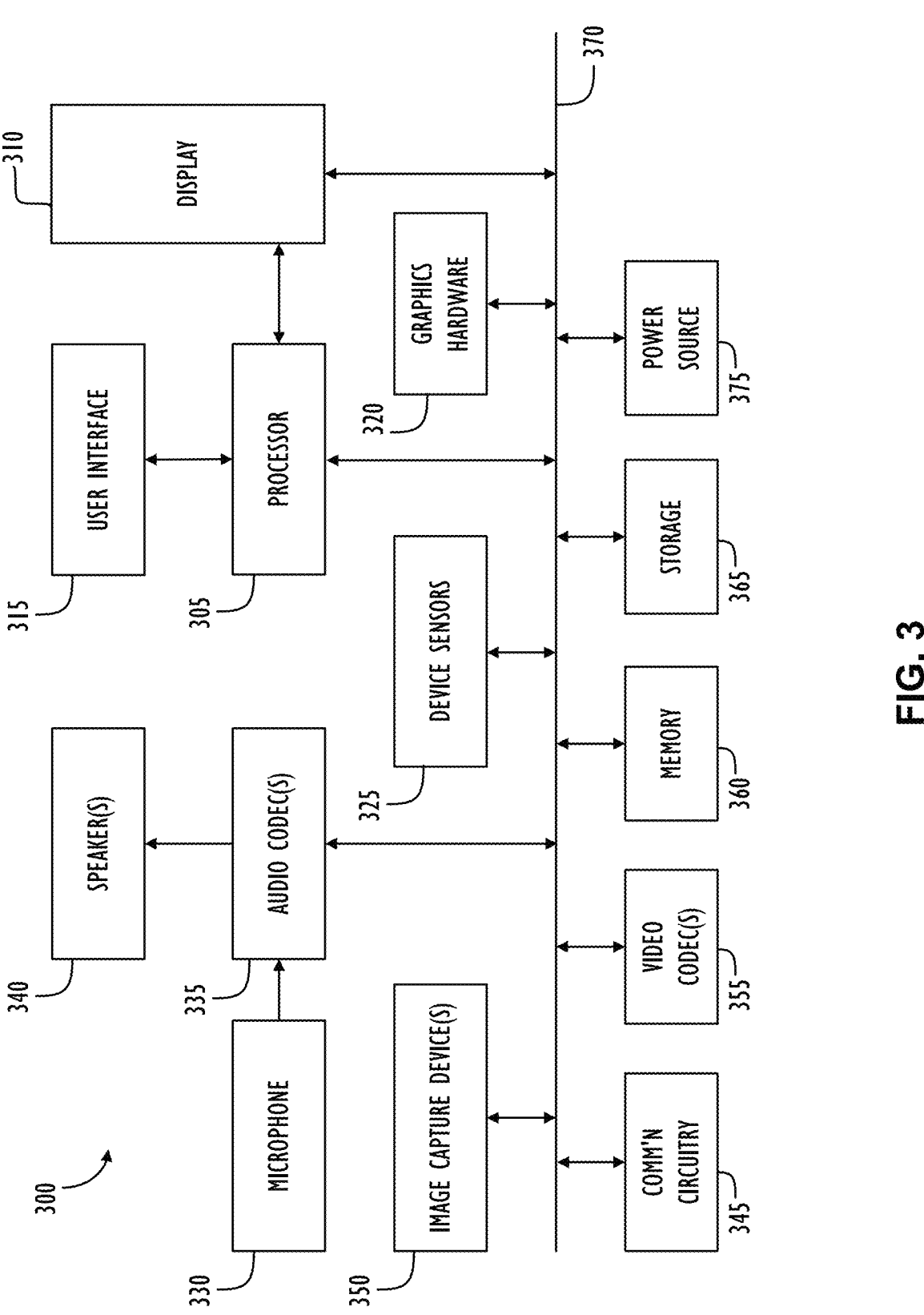
FIG. 3 depicts an example network diagram in which embodiments described herein may operate.

Referring now to FIG. 3, a simplified functional block diagram of illustrative multifunction device 300 is shown according to one embodiment. Multifunctional device 300 may show representative components, for example, for devices of underwater operating environment 100, devices 106, and client devices 108 of FIG. 1. Multifunction electronic device 300 may include processor 305, display 310, user interface 315, graphics hardware 320, device sensors 325 (e.g., proximity sensor/ambient light sensor, accelerometer and/or gyroscope), microphone 330, audio codec(s) 335, speaker(s) 340, communications circuitry 345, digital image capture circuitry 350 (e.g., including camera system) video codec(s) 355 (e.g., in support of digital image capture unit), memory 360, storage device 365, and communications bus 370. Multifunction electronic device 300 may be, for example, a waterproofed laptop, an untethered or tethered robot or instrument, a remotely operated vehicle (ROV), an autonomous underwater vehicle (AUV), a drifting moor or sensor, a personal electronic device, a wearable sensor, or the like.

Processor 305 may execute instructions necessary to carry out or control the operation of many functions performed by device 300 (e.g., such as the generation and/or processing of images or video, the collection of sensor data, and/or the issuance of control/operation commands as disclosed herein). Processor 305 may, for instance, drive display 310 and receive user input from user interface 315. User interface 315 may allow a user to interact with device 300. For example, user interface 315 can take a variety of forms, such as a button, keypad, dial, a click wheel, keyboard, display screen and/or a touch screen. Processor 305 may also, for example, be a system-on-chip such as those found in mobile devices and include a dedicated graphics processing unit (GPU). Processor 305 may be based on reduced instruction-set computer (RISC) or complex instruction-set computer (CISC) architectures or any other suitable architecture and may include one or more processing cores. Graphics hardware 320 may be special purpose computational hardware for processing graphics and/or assisting processor 305 to process graphics information. In one embodiment, graphics hardware 320 may include a programmable GPU.

Image capture circuitry 350 may include two (or more) lens assemblies 380A and 380B, where each lens assembly may have a separate focal length. For example, lens assembly 380A may have a short focal length relative to the focal length of lens assembly 380B. Each lens assembly may have a separate associated sensor element 390. Alternatively, two or more lens assemblies may share a common sensor element. Image capture circuitry 350 may capture still and/or video images. Output from image capture circuitry 350 may be processed, at least in part, by video codec(s) 355 and/or processor 305 and/or graphics hardware 320, and/or a dedicated image processing unit or pipeline incorporated within circuitry 365. Images so captured may be stored in memory 360 and/or storage 365.

Sensor and camera circuitry 350 may capture still and video images that may be processed in accordance with this disclosure, at least in part, by video codec(s) 355 and/or processor 305 and/or graphics hardware 320, and/or a dedicated image processing unit incorporated within circuitry 350. Images so captured may be stored in memory 360 and/or storage 365. Memory 360 may include one or more different types of media used by processor 305 and graphics hardware 320 to perform device functions. For example, memory 360 may include memory cache, read-only memory (ROM), and/or random-access memory (RAM). Storage 365 may store media (e.g., audio, image and video files), computer program instructions or software, preference information, device profile information, and any other suitable data. Storage 365 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 360 and storage 365 may be used to tangibly retain computer program instructions or code organized into one or more modules and written in any desired computer programming language. When executed by, for example, processor 305 such computer program code may implement one or more of the methods described herein.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are examples only and are thus not limiting as to the types of memory usable for storage of a computer program.

In some embodiments, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The foregoing description and drawings should be considered as illustrative only of the principles of the invention. The invention is not intended to be limited by the preferred embodiment and may be implemented in a variety of ways that will be clear to one of ordinary skill in the art. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A submerged operating environment, comprising:
a first set of one or more computing devices associated with one or more system administrators;
a second set of one or more computing devices communicatively coupled to the first set of computing devices; and
a submerged space comprising a third set of one or more computing devices communicatively coupled to the first and second set of one or more computing devices;
wherein at least one of the first set of one or more computing devices is configured to:
operate while submerged with a diver, or from within the submerged space that is an underwater structure having one or more modular compartments with reinforced pressure-resistant walls, or an ambient pressure system, and
the diver and the submerged space are associated with integrated life support systems, and one or more communication interfaces;
transmit one or more control commands to the second set of one or more computing devices;
receive one or more signals from the second set of one or more computing devices in response to the one or more control commands; and transmit an alert to the third set of one or more computing devices based on the one or more signals received from the second set of one or more computing devices.

2. The submerged operating environment of claim 1, wherein the one or more system administrators is the diver, a submersible pilot or operator, a habitat occupant, or an underwater data center technician.

3. The submerged operating environment of claim 1, wherein the submerged space includes an anchor mechanism attached to the submerged space to maintain the submerged space at a desired depth underwater.

4. The submerged operating environment of claim 1, wherein the first, second, and third set of one or more computing devices are communicatively coupled to each other via a wireless connection, a wired connection, or a combination thereof.

5. The submerged operating environment of claim 1, wherein the one or more control commands manipulate movement of at least one of the second set of one or more computing devices.

6. The submerged operating environment of claim 1, wherein the at least one of the second set of one or more computing devices is a remotely operated vehicle (ROV), an autonomous underwater vehicle (AUV), a drifting sensor, or a moored sensor.

7. The submerged operating environment of claim 1, wherein the first set of one or more computing devices, the second set of one or more computing devices, and the third set of one or more computing devices form a local area network.

8. The submerged operating environment of claim 7, wherein the local area network operates independently from a top-surface network.

9. The submerged operating environment of claim 1, wherein the first set of one or more computing devices, the second set of one or more computing devices, and the third set of one or more computing devices communicate using acoustic signals, optical signals, quantum electro-magnetic signals, or combinations thereof.

10. An underwater communication system, comprising:
a submerged space for scientific research, the submerged space comprising modular compartments with reinforced pressure-resistant walls or an ambient pressure system, integrated life support systems, one or more communication interfaces, a data center, a network access point, and an anchor mechanism, or
a diver who is associated with the integrate life support systems, the one or more communication interfaces, the data center, and the network access point;
a plurality of computing devices, each computing device equipped with a network communication interface, wherein the plurality of computing devices forms an underwater computer network to facilitate data exchange in an underwater environment;
a plurality of sensors connected to the underwater computer network;
wherein at least one of the plurality of computing devices is housed within the submerged space and is configured to:
receive one or more signals from the plurality of sensors via the underwater computer network;
detect for anomalies in the one or more signals; and
in response to detecting at least one anomaly in the one or more signals, transmit an alert to trigger an alarm within the submerged space.

11. The underwater communication system of claim 10, wherein the plurality of computing devices includes one or more autonomous underwater vehicles (AUVs).

12. The underwater communication system of claim 10, wherein the underwater computer network operates independently of a top-side surface connection.

13. The underwater communication system of claim 10, wherein the alert is transmitted to a top-side and nearby vessel.

14. A submerged space for scientific research, the submerged space comprising:

one or more modular compartments with reinforced pressure-resistant walls or an ambient pressure system, integrated life support systems, and one or more communication interfaces; and at least one computing device comprising a memory and a processor, wherein the memory includes instructions that when executed by the processor implement:

receiving, via a user interface, one or more control commands to operate one or more underwater devices;

sending, via the one or more communication interfaces, the one or more control commands to the one or more underwater devices;

receiving, from the one or more underwater devices, sensor data from one or more environmental sensors of the one or more underwater devices;

in response to the sensor data comprising anomaly data, generating an alert based on the anomaly data; and transmitting the alert on an underwater communication network.

15. The submerged space of claim 14, wherein the at least one computing device is associated with a diver, a submersible pilot or operator, a habitat occupant, or an underwater data center technician.

16. The submerged space of claim 14, wherein the submersible habitat is an underwater habitat.

17. The submerged space of claim 14, wherein the at least one computing device and the underwater devices are communicatively coupled via a wireless connection, a wired connection, or a combination thereof.

18. The submerged space of claim 14, wherein the one or more control commands manipulate movement of at least one of the underwater devices.

19. The submerged space of claim 14, wherein:

the underwater devices include at least one of a remotely operated vehicle (ROV) and an autonomous underwater vehicle (AUV); and the one or more environmental sensors include at least one of a drifting sensor and a moored sensor.

20. The submerged operating environment of claim 1, wherein the submerged space includes a modular payload which removably attaches to an underwater envelope, the modular payload having a breathable gas source and a carbon dioxide scrubber.

\* \* \* \* \*